Patented Sept. 20, 1938

2,130,480

UNITED STATES PATENT OFFICE 2,130,480

PROCESS OF HYDROGENATING 5-NITRO-PHTHALIDE

Paul R. Austin, Wilmington, Del., assignor to E. I. du Pont de Nemours & Company, Wilmington, Del., a corporation of Delaware No Drawing. Application January 24, 1935, Serial No. 3,287

2 Claims. (Cl. 260—344)

This invention relates to amino aromatic lactones and more particularly to 5-aminophthalide.

Amino aromatic lactones have been produced in the past by the hydrogenation of nitro-aromatic lactones with nascent hydrogen. Thus, 5-nitrophthalide has been reduced to 5-aminophthalide by the use of tin and hydrochloric acid and by the use of iron and acetic acid. However, to my knowledge no one has produced 5-aminophthalide in the manner described herein.

This invention has as its object the preparation of 5-aminophthalide.

This object is accomplished by catalytically hydrogenating 5-nitrophthalide in the liquid state to 5-aminophthalide. The following examples show how the process can be carried out. These are to be considered as illustrative only and not as limiting the scope of the invention.

Example I

Forty-nine grams of 5-nitrophthalide, 2.5 grams of nickel-on-kieselguhr catalyst, and 100 grams of absolute ethyl alcohol were mixed, charged into a pressure vessel equipped with a mechanical agitator, and hydrogen was introduced at 1,000 to 1,500 pounds per square inch pressure. The temperature was raised and hydrogen absorption began at 115° C. The temperature was maintained at 120° C. and hydrogen absorption was complete in 15 minutes. The run was continued for 15 more minutes. Filtration of the mixture, followed by extraction of the filter cake with a mixture of ethyl acetate and ethyl alcohol, yielded 30 grams of 5-aminophthalide or 74% of the theoretical amount.

Example II

One thousand grams of 5-nitrophthalide, 50 grams of nickel-on-kieselguhr catalyst, and 3,500 grams of absolute ethyl alcohol were charged into an autoclave equipped for agitation, hydrogen was introduced at 1,000 pounds per square inch pressure and the temperature raised. Hydrogen absorption began at 100° C. and the temperature was maintained between 110° C. and 150° C. Hydrogen absorption was complete in thirty minutes but the run was continued for one hour more. The mixture was worked up using butyl alcohol as a solvent yielding 888 grams of 5-aminophthalide, or 85% of the theoretical amount.

The above method, as illustrated by the examples, broadly consists in the catalytic hydrogenation of 5-nitrophthalide. In this process nickel-on-kieselguhr is the preferable catalyst used and absolute ethyl alcohol is the preferable solvent. The hydrogenation is preferably carried out at a temperature from 100° C. to 150° C. and under a pressure of 1,000 to 2,000 pounds per square inch of hydrogen.

5-nitrophthalide is prepared by nitrating phthalide at room temperature with a mixture of nitric and sulfuric acids. The crude nitrophthalide is separated by pouring the acid mixture into cold water, subsequently filtered, and washed until acid free. This is determined by testing the wash waters with litmus paper and with a solution of barium chloride. The crude nitrophthalide, which generally melts at 136° to 138° C., may be recrystallized from a suitable solvent such as glacial acetic acid or may be hydrogenated directly without further purification.

The 5-nitrophthalide is mixed with alcohol in the approximate ratio of two parts by weight of solvent to one part of nitrophthalide. The catalyst, nickel-on-kieselguhr, is added in the approximate ratio of fifty parts of catalyst to one thousand parts of nitrophthalide. The mixture is hydrogenated in a closed vessel at a temperature of approximately 125°±25° C. and under a hydrogen pressure of one to two thousand pounds per square inch until the approximate amount of hydrogen theoretically necessary to reduce the nitro group is taken up. This is generally accomplished in less than one hour.

The crude reaction mixture is filtered and the solid residue repeatedly extracted with either ethyl or butyl alcohol, chloroform, or a mixture of ethyl acetate and alcohol until removal of the aminophthalide from the catalyst is complete. The solution of aminophthalide is heated and decolorized partially by the use of activated carbon. The resulting solution is concentrated and the aminophthalide recovered by chilling this concentrated solution. The pure product is a pale yellow solid with a melting point of 182° C. It is soluble in hot absolute alcohol, chloroform, and ethyl acetate but only moderately soluble in these solvents when cold. It is only very slightly soluble in water. It tends to acquire a deeper color on prolonged exposure to air, especially if it is contaminated with other reduction products.

Variations in the solvents used may be made. For example, benzene, methyl alcohol, 95% ethyl alcohol, butyl alcohol, ether or acetone may be used in place of absolute ethyl alcohol. Besides nickel other members of the iron group are especially suitable as catalysts for this reaction. However, other hydrogenation catalysts may be used. The following example will serve to show the manner of preparing a suitable catalyst, the element in this case being nickel.

A quantity of metallic nickel is dissolved in a mixture of equal parts by weight of 70 per cent nitric acid and water, the solution is filtered, and diluted with water to approximately twice its original volume. To the mixture is then added a quantity of kieselguhr weighing 10 per cent more than the original nickel used. A solution of sodium bicarbonate (approximately 6 per cent strength) is added to the nickel-nitrate-kieselguhr mixture with vigorous stirring and in sufficient quantity to precipitate all the nickel. The resulting precipitate is washed thoroughly with cold water, filtered, dried and reduced with hydrogen at 450° C.

Catalyst supports other than kieselguhr may be used, for example, carbon, alumina, charcoal, pumice, asbestos, or quartz. The free metal itself may be used with no supporting material although such catalysts are less durable. The ratio of the quantity of material to the quantity of phthalide may be varied over a considerable range. Similarly, the ratio of the solvent to the quantity of nitrophthalide may be varied over a wide range.

The temperature range, 100° to 150° C., is preferable but hydrogenation is not confined to these temperatures since it varies to some extent with the pressure and catalyst. In general, I apply hydrogen pressure and then raise the temperature until absorption begins and hold at this temperature until the reaction is complete. The pressure of hydrogen is not critical and, although I generally use pressures above 10 atmospheres and preferably above 50 atmospheres for nickel catalyst, the upper limit is determined only by the strength of the operating equipment.

While I prefer to use pure hydrogen in the reduction process, the reduction may also be accomplished by a mixture of hydrogen with such inert gases as carbon dioxide, nitrogen, methane, or steam, individually or in various combinations. The nature of the reducing mixture to be used is determined by the activity of the catalyst employed in the process.

Purification of the aminophthalide may be accomplished by means other than crystallization, e. g., the mixture from the hydrogenation vessel may be evaporated to dryness, the solid taken up in concentrated hydrochloric acid and filtered to remove the insoluble matter (kieselguhr). The filtered solution is treated with a large excess of ammonia, sufficient to retain all the nickel in solution. The aminophthalide precipitates and is removed by filtration. A continuous process whereby a solution of aminophthalide is passed over a hydrogenating catalyst with hydrogen may also be used.

5-aminophthalide and the substituted aminophthalides are valuable as intermediates in the preparation of dyestuffs. They are also useful as intermediates in the synthesis of pharmaceuticals and antioxidants.

Previously the reduction of 5-nitrophthalide has been accomplished primarily by the combined use of metals and acids. Such processes generally involve the use of considerable quantities of metal powder with subsequent difficulties in its removal. It is also difficult to determine when reduction is complete and to control the temperature during reduction to a point below which the desired compound is not partially destroyed. Yields are generally low, e. g., 50% or 60%, and the product obtained is difficult to purify. In the present process the reaction is rapid and the temperature can be controlled within a desired range. The completeness of the reaction can be determined by measuring the absorption of hydrogen. Yields of 85% may readily be obtained. These high yields are unexpected in view of the fact that phthalide in alkaline solution hydrogenates readily to o-toluic acid.

It should be noted that the system of nomenclature used in the above description is based on the following scheme:

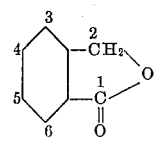

in which position 2 is also called the α-position.

As many apparently widely different embodiments of this invention may be made without departing from the spirit and scope thereof, it is to be understood that I do not limit myself to the specific embodiments thereof except as defined in the appended patent claims.

I claim:

1. The process for the production of 5-aminophthalide which comprises catalytically hydrogenating 5-nitrophthalide in a liquid state in the presence of an inert solvent with a catalyst consisting of nickel on kieselguhr, while maintaining a temperature of about 100° C. to about 150° C. and under a pressure of about 1000 to about 1500 pounds per square inch, and recovering the 5-aminophthalide formed.

2. The process according to claim 1 characterized in that the inert solvent is ethyl alcohol.

PAUL R. AUSTIN.